No. 741,074. PATENTED OCT. 13, 1903.
A. J. SECKNER.
TWINE HOLDER.
APPLICATION FILED APR. 13, 1903.
NO MODEL.
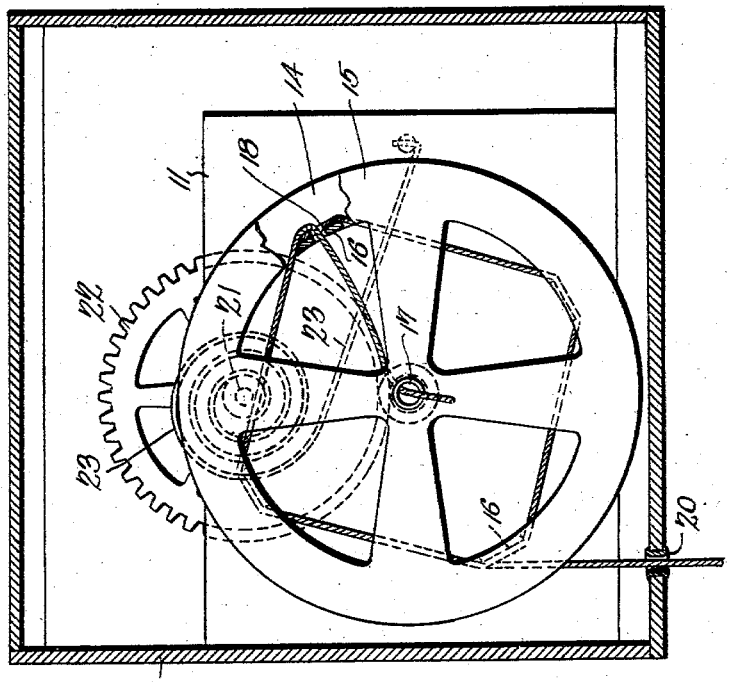
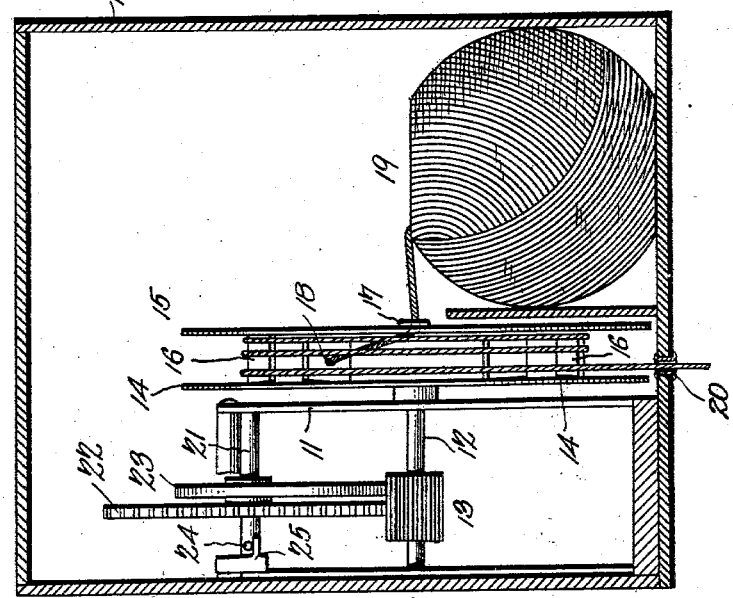
Albert J. Seckner, Inventor No. 741,074. Patented October 13, 1903.

UNITED STATES PATENT OFFICE.

ALBERT J. SECKNER, OF LONGMONT, COLORADO.

TWINE-HOLDER.

SPECIFICATION forming part of Letters Patent No. 741,074, dated October 13, 1903.

Application filed April 13, 1903. Serial No. 152,429. (No model.)

*To all whom it may concern:*

Be it known that I, ALBERT J. SECKNER, a citizen of the United States, residing at Longmont, in the county of Boulder and State of Colorado, have invented a new and useful Twine-Holder, of which the following is a specification.

This invention relates to devices for holding wrapping-twine, and has for its object to produce a device whereby the surplus twine is automatically withdrawn into the receptacle or the free end elevated to the same point after each using in convenient position for use the next time it is required; and the invention consists in certain novel features of the construction, as hereinafter shown and described, and specified in the claims.

In the drawings illustrative of the invention, in which corresponding parts are denoted by like designating characters, Figure 1 is a sectional side elevation. Fig. 2 is a front elevation of the operating parts with the casing in section.

The improved device will be located at any point convenient to the user and is generally suspended from the ceiling or any other suitable support.

For the purpose of illustration the device is shown inclosed in a casing 10 of any suitable material and of any suitable size.

The improvement comprises a supporting-frame 11 of any approved form, in which a main shaft 12 is mounted for rotation and provided with a pinion 13, and also supporting a twine-reel upon its extended end outside the frame. This reel consists of an inner disk 14, centrally mounted upon the shaft 12, and an outer disk 15, spaced from the inner disk and connected thereto by a plurality of spaced bars 16, the bars being attached between the rims of the disks and their axial lines, whereby a winding-surface is formed with the rims of the disks forming the end flanges, as shown.

The outer disk 15 is provided with a central aperture 17, and a similar aperture 18 is formed through one of the bars 16, as shown.

The ball of twine is represented at 19, and the end will be carried through the central aperture 17, thence through the aperture 18, and wound a number of turns around the bars 16, and then passed out through an aperture 20 in the casing 10, as shown.

Mounted for rotation in the frame 11 is a counter-shaft 21, carrying a gear 22, engaging the pinion 13, and also carrying a coiled spring 23, one end of the spring being connected to the shaft and the other end to the frame 11, casing 10, or other stationary part of the device.

The shaft 21 is provided with a stud 24, and the frame 11 is provided with a stop 25, projecting into the path of the stud, the spring 23 operating to maintain the stud normally in yieldable engagement with the stop. By this simple means the power of the spring will be utilized to keep the predetermined number of "turns" of the twine constantly upon the reel, and as fast as it is drawn off for wrapping bundles a fresh supply will be automatically drawn from the ball 19.

The small size of the pinion 13 and the relatively large size of the gear 22 will permit the comparatively large reel to wind up a correspondingly long stretch of the twine while the shaft is making one complete revolution. Consequently a comparatively small spring 23 will be ample to produce the required movement of the reel. This is an important feature of the invention and adds materially to the value and efficiency of the device and likewise materially lightens the structure and reduces the expense of manufacture.

Any desired number of the turns of the twine may be employed upon the reel, the required number depending upon the conditions under which the device is used; but generally from three to five will be sufficient.

The casing 10 may be of any size or material and may be of wood or metal, as desired, and may be painted, japanned, plated, or otherwise ornamented and protected.

The device may be suspended in any desired manner, attached to a post or standard or other support, and may be modified in minor particulars without departing from the principle of the invention or sacrificing any of its advantages.

Having thus described the invention, what I claim is—

1. In a twine-holder, the combination with a frame, of a shaft mounted for rotation therein, a reel carried by and rotatable with said shaft, a pinion fixedly associated with the shaft, a rotary counter-shaft, a gear carried thereby in mesh with the pinion, means for rotating the counter-shaft in one direction to drive the reel-shaft, said counter-shaft being rotatable in the opposite direction to permit reverse rotation of the reel-shaft, and means for limiting the rotation of the counter-shaft in both directions.

2. In a twine-holder, the combination with a frame, of a shaft mounted for rotation therein, a reel carried by and rotatable by said shaft, a pinion fixedly associated with the shaft, a rotary counter-shaft, a gear carried thereby and in mesh with the pinion, means for rotating the counter-shaft in one direction to drive the reel-shaft, said counter-shaft being rotatable in the opposite direction to permit reverse rotation of the reel-shaft, a stop associated with the frame, and a pin carried by the counter-shaft for engaging the stop to limit the rotation of said shaft in both directions.

In testimony that I claim the foregoing as my own I have hereto affixed my signature in the presence of two witnesses.

ALBERT J. SECKNER.

Witnesses:
 DOY GRAY,
 WALTER COULEHAN.